(12) United States Patent
Hanrahan et al.

(10) Patent No.: US 7,803,867 B2
(45) Date of Patent: Sep. 28, 2010

(54) HIGHLY WEATHERABLE ROOF COATINGS CONTAINING AQUEOUS FLUOROPOLYMER DISPERSIONS

(75) Inventors: Kevin Hanrahan, Wayne, PA (US); Kurt Wood, Abington, PA (US); Lotfi Hedhli, King of Prussia, PA (US); Ravi Gupta, Norristown, PA (US); Wayne Skilton, Jenkintown, PA (US)

(73) Assignee: Arkema Inc., Philadelphia, PA (US)

( * ) Notice: Subject to any disclaimer, the term of this patent is extended or adjusted under 35 U.S.C. 154(b) by 1023 days.

(21) Appl. No.: 11/403,723

(22) Filed: Apr. 13, 2006

(65) Prior Publication Data

US 2006/0264563 A1    Nov. 23, 2006

Related U.S. Application Data

(60) Provisional application No. 60/682,513, filed on May 19, 2005.

(51) Int. Cl.
*D06M 15/277* (2006.01)
(52) U.S. Cl. ............... 524/544; 428/421; 525/199; 525/222; 525/326.2
(58) Field of Classification Search .......... 524/544; 428/421; 525/199, 222, 326.2
See application file for complete search history.

(56) References Cited

U.S. PATENT DOCUMENTS 4,383,075 A * 5/1983 Abel ................ 524/512
5,132,164 A * 7/1992 Moriya et al. ............ 428/199
5,349,003 A    9/1994 Kato et al.
5,532,304 A    7/1996 Miyazaki et al.
6,242,557 B1   6/2001 Temtchenko et al.
6,635,714 B1 * 10/2003 Wood et al. ............ 525/199
6,680,357 B1 *  1/2004 Hedhli et al. ........... 525/326.2
6,833,414 B2   12/2004 Granel et al.
6,841,616 B2    1/2005 Wille et al.
6,888,997 B2    5/2005 Duong
2003/0204020 A1 10/2003 Wood et al.
2004/0185261 A1 * 9/2004 Umino et al. ........... 428/418
2004/0192828 A1   9/2004 Mitsuhata et al.

FOREIGN PATENT DOCUMENTS

EP    748826 A1 * 12/1996
EP    869157 A1 * 10/1998

OTHER PUBLICATIONS

Database CA Chemical Abstracts Service, Columbus, Ohio, US: accession No. 133:310955 & KP-A-2000 290 536.

* cited by examiner

*Primary Examiner*—Peter D. Mulcahy
*Assistant Examiner*—Henry Hu
(74) *Attorney, Agent, or Firm*—Thomas F. Roland

(57) ABSTRACT

The invention relates to an aqueous-based fluoropolymer coating that is especially useful for use over flat or low-slope flexible surfaces, and more specifically for flat or low-slope roofing. The coating can be factory or field applied. The coating offers the advantages of improved durability, lower dirt pick-up, stain resistance, water repellency, increased solar reflectivity duration, and mildew resistance.

13 Claims, No Drawings

HIGHLY WEATHERABLE ROOF COATINGS CONTAINING AQUEOUS FLUOROPOLYMER DISPERSIONS

This application claims benefit under U.S.C. §119(e) of U.S. provisional application 60/682,513, filed May 19, 2005.

FIELD OF THE INVENTION

The invention relates to an aqueous-based fluoropolymer coating that is especially useful for use over flat or low-slope flexible surfaces, and more specifically for flat or low-slope roofing. The coating can be factory or field applied. The coating offers the advantages of improved durability, lower dirt pick-up, stain resistance, water repellency, increased solar reflectivity duration, and mildew resistance.

BACKGROUND OF THE INVENTION

Traditional field-applied coatings for flexible roofs are based upon acrylic, urethane or silicone resins. These coatings are often spray applied over existing or new roofs made from EPDM, asphalt, sprayed foam, polyolefin or other membrane, and they must be highly flexible to resist cracking or other damage due to hail and other environmental stresses. A significant fraction of these coatings are white in color, to reflect a high fraction of solar radiation, and thereby reduce building energy costs by maintaining a cool roof. Some standards for cool roofs are defined by the Cool Roof Ratings Council. However, the coatings of the current art do not often maintain their reflectivity over time, due to two main factors: 1) dirt pickup and environmental staining of the coating, and 2) sunlight/UV degradation and erosion of the polymer binder in the coating.

Reflectivity can also be lost if the topcoat polymer binder has (or develops after weathering) inadequate barrier properties to prevent the leaching to the surface of low molecular weight components, such as plasticizers or colored impurities (e.g. asphaltic materials), which are present in interior layers of the roofing system. These plasticizers and colored impurities serve as a food source for fungi and other biological organisms.

When they are near the surface of the roof, they promote the growth of colored fungi, molds, mildew and algae, which causes staining and further decreases the reflectivity of the roof. The growth of biological organisms is also promoted by high rates of water absorption in the coating layer. Thus, protective roofing coatings are needed which have very low levels of water absorption (initially and after outdoor weathering), and which also block the migration of plasticizers and other colored impurities from the interior of the roofing system.

One method, known in the art to reduce dirt pickup, is to make the topcoat polymer binder "harder", either by raising the glass transition temperature (Tg) of the polymer, or by increasing the level of crosslinking in the final polymer film to high levels, as described in U.S. Pat. No. 6,680,357 and U.S. Pat. No. 6,833,414. Unfortunately, the ability to do this in practice for flexible roof coatings is limited by the requirement that the coating maintain excellent flexibility. Higher Tg coatings also generally require higher levels of volatile organic solvents (VOC), which can limit their use or disqualify them as ecologically friendly, low VOC coatings. If insufficient levels of coalescing solvents (VOCs) are used with these harder materials, the coatings crack upon application, and no longer have good water repellency or protective properties.

U.S. Pat. No. 5,532,304 likewise teaches a method of combining crosslinkable fluoropolymers with certain curing agents and also tetrafunctional hydrolyzable silane oligomers, in order to increase the stain resistance of the coating. However, this patent does not concern itself with maintaining the flexibility of the coating, in order to maintain a favorable balance of properties over flexible substrates. Moreover, in this reference, high levels of tetrafunctional silane oligomers are preferred (from 5 to 50% based on fluoropolymer), which will greatly limit the flexibility of the coating.

Highly weatherable "cool roof" paints for roofing, made using coil coatings of solvent dispersions of fluoropolymers including poly(vinylidene fluoride) resins, are known, for instance KYNAR 500® PVDF resin (Arkema Inc.), or solvent solutions of fluoropolymers such as poly(vinylidene fluoride) copolymers such as KYNAR 9301 (Arkema Inc.), Zeffle LC 700 (Daikin), so-called FEVE resins (e.g. Lumiflon resins from Asahi Glass), and perfluoroether coatings as taught in U.S. Pat. No. 6,242,557. Many of these paints show excellent stain and dirt resistance, and maintain their "cool roof" characteristics over a long period of time, but they use high levels of VOCs and so do not qualify as low VOC coatings. Moreover, the coil coatings require high baking temperatures, and therefore they cannot be applied on most flexible roofing substrates. They likewise cannot be site-applied on existing roofs, for the same reason.

Surprisingly, it has now been found that a coating composition containing an aqueous-based, acrylic-modified fluoropolymer can be used on flexible substrates to provide significantly improved durability, improved stain repellency including the ability to block plasticizer migration, low water absorption, lower dirt pickup and longer retention of reflectivity, coupled with low levels of VOCs.

SUMMARY OF THE INVENTION

It is an objective of the invention to provide an aqueous-based roof coating having improved durability, lower dirt pick-up, stain resistance, water repellency, increased solar reflectivity duration, and mildew resistance.

It is a further object of the invention to provide a polyvinylidene fluoride-based roof coating that can be factory or field applied as either the complete roof coating or as a topcoating.

These objects are met by an aqueous fluoropolymer coating composition wherein said fluoropolymer has an weight average molecular weight of greater than 100,000.

The objects are further met by a aqueous fluoropolymer coating composition wherein said fluoropolymer is an acrylic-modified fluoropolymer.

DETAILED DESCRIPTION OF THE INVENTION

The invention relates to an aqueous fluoropolymer coating composition for use on flexible surfaces. The fluoropolymer is a high molecular weight fluoropolymer, with a weight average molecular weight of greater than 100,000. The term "fluoropolymer" refers to polymers and copolymers (including polymers having two or more different monomers, including for example terpolymers) containing at least 50 mole percent of fluoromonomer units. The term "(co)polymers" is used herein to denote both polymers and copolymers. Suitable exemplary fluoromonomers for use according to the invention include, but are not limited to, vinylidene fluoride, vinyl fluoride, trifluoroethylene, chlorotrifluoroethylene (CTFE), tetrafluoroethylene (TFE), and hexafluoropropylene (HFP) and their respected copolymers.

In a preferred embodiment, the fluoropolymer is an acrylic modified fluoropolymer or "AMF" type dispersion with an interpenetrating network type morphology, specifically, one containing from about 50% to 95% of a $VF_2$ copolymer by weight on solids, plus an acrylic composition which is thermodynamically miscible with it. Optionally, from 1%-20% of a second polymer dispersion, e.g. an acrylic latex or a polyurethane dispersion, can be blended in as well; likewise, coalescing solvents can be added at levels from 0 to about 40% based on the weight of the polymer solids.

More preferably, the AMF polymer contains from about 70%-90% of a $VF_2$/HFP copolymer, with the level of HFP in the polymer being from about 18-28 wt %. The acrylic in the AMF is a copolymer of MMA, plus EA or BA, plus a low level of copolymerized acid monomer such as MAA. Most preferred formulations contain about 0-10% of a water miscible coalescent such as dipropylene glycol methyl ether or butyl diglycol. As blend agents, aliphatic polyurethane dispersions such as Sancure 815 are preferred, at levels of 0-10 wt % on polymer solids.

The manner of making and using the fluoropolymer of the invention will now be illustrated with reference to a specific embodiment thereof, namely an acrylic modified fluoropolymer prepared by using vinylidene fluoride-hexafluoropropylene copolymer seed having 85.8 weight percent vinylidene fluoride content and 14.2 weight percent hexafluoropropylene content and a melt viscosity at 232° C. of 23 kp (ASTM D 3835 using 15:1 L/D capillary having 120° cone entrance angle) as a seed latex in a polymerization of a mixture of acrylic monomers comprising methyl methacrylate, and ethylacrylate in an 18:9 parts by weight ratio with the vinylidene fluoride-hexafluoropropylene copolymer to total acrylic solids being present in about a 70:30 parts by weight ratio.

The vinylidene fluoride, hexafluoropropylene copolymer latex employed as a starting material in the practice of the invention, may be prepared by a process analogous to that of U.S. Pat. No. 3,178,399. The synthesis is controlled by the art known technique of use of appropriate amounts of surfactant and/or the ratio of water to monomer to provide particles in the latex having average size less than 250 nm, preferably less than 150 nm, so that final particle size will average less than 350 nm.

The vinylidene fluoride-hexafluoropropylene copolymer latex may be precharged to a suitably sized reaction vessel equipped with a suitable stirring device, a feed inlet for addition of reactants, a suitable reflux condenser and an inlet for inert blanketing gas in combination with a free radical initiator, such as ammonium persulfate and a surfactant, such as sodium lauryl sulfate, a portion of a mixture of methyl methacrylate (18 parts by weight), and ethyl acrylate (9 parts by weight) and isooctylmercaptopropionate (about 1 part by weight) is then added and stirring is commenced at a rate sufficient to mix the contents but not cause coagulation of the latex emulsion, conveniently about 90 rpm. The reactor and its contents are then purged with an inert gas, conveniently argon, for a soaking/purge period sufficient to ensure elimination of air, conveniently about 30 minutes. At the end of this time, the temperature of the reactor and its contents is raised to about 70° C. and reaction time is measured from the start of the heating period. After the reaction continues for a time, conveniently about one hour, the remaining monomer mixture is fed, conveniently with the aid of a syringe pump at a rate sufficient to maintain the reaction but not exceed the heat exchange capacity of the reflux condenser. When all the monomer mixture has been added, the reaction is allowed to continue while maintaining 70° C. and agitation, to consume unreacted monomers, for an additional period of time, conveniently about 120 minutes. The reactor is then cooled to ambient temperature, about 20° C., vented and the latex contained in the reactor filtered through cheesecloth.

One of skill in the art will understand that in addition to the specific vinylidene fluoride-hexafluoropropylene polymer latex specifically illustrated as a starting material, the invention contemplates, as equivalents, other known vinylidene fluoride hexafluoropropylene copolymers, see, for example, U.S. Pat. No. 5,093,427 and PCT Application WO 98/38242 and vinylidene fluoride homopolymers, see U.S. Pat. Nos. 3,475,396 and 3,857,827, which can be substituted as seed polymers in the afore described reaction.

The invention also contemplates as suitable seed polymers vinyl fluoride (co)polymers and vinylidene fluoride (co)polymers of the types described in U.S. Pat. Nos. 5,646,201; 5,925,705; 6,242,547; and 6,403,740, incorporated herein by reference.

One of skill in the art will also recognize that in addition to the butyl acrylate, methyl methacrylate and methacrylic acid specifically illustrated, any of the known acrylic monomers and ethylenically unsaturated monomers known to be copolymerizable with acrylic monomers may be substituted, with the proviso that the major portion of the monomers must be selected from acrylic esters and methacrylic esters. Suitable acrylic, methacrylic and other copolymerizable monomers include, but are not limited to: ethylacrylate (EA), methyl acrylate (MA), butyl acrylate (BA), amylacrylate, 2-ethylhexylacrylate, hexylacrylate, ethyl methacrylate (EMA), methyl methacrylate (MMA), butyl methacrylate, propyl methacrylate, amyl methacrylate, 2-ethyl hexyl methacrylate, alpha-beta-unsaturated carboxylic acids (acrylic acid or AA, methacrylic acid (MAA), fumaric acid, crotonic acid, itaconic acid or IA), vinyl ester compounds, and amide compounds (acrylamide, methacrylamide). Ethylacrylate, methylacrylate, butyl acrylate and methyl methacrylate are preferred.

Additionally, small amounts of monomers capable of cross-linking can also be used, including but not limited to: allyloxy propane diol (AOPD), isobutylmethacrylate, aceto acetoxy ethylmethacrylate (AEA or AAEM), N-alkyl methacrylamide, N-methylol methacrylamide or NMA, N-alkyl acrylamide, N-dialkyl methacrylamide, N-dialkyl acrylamide, isobutoxy methacrylamide (IBMA or iBMA)), ethylenically unsaturated monomers containing hydroxyl groups (hydroxylethyl methacrylate or HEMA, hydroxyethyl acrylate, hydroxypropyl acrylate, hydroxypropyl methacrylate, diethylene glycol ethyl acrylate or DGEA for example), monomers containing epoxy groups (glycidyl acrylate, glycidyl methacrylate or GMA, for example), monomers containing silanols (.gamma. trimethoxysilane methacrylate, .gamma. triethoxysilane methacrylate, trimethyl silyl propyl acrylate (TMPA or TMSPA), for example), and monomers containing aldehyde functions, such as acrolein, alkenyl cyanides, such as acrylonitrile methacrylonitrile.

Some non-functional monomers may also be incorporated, such as, conjugated dienes, for example, 1,3-butadiene, isoprene, fluoro alkyl acrylates, fluoro alkyl methacrylates, aromatic alkenyl compounds, for example, styrene, alpha-methylstyrene, styrene halides and divinyl hydrocarbon compounds, for example, divinyl benzene. If desired, small amounts of copolymerizable low molecular weight polymers or oligomers may also be included as may known reactive emulsifying agents. Monomers containing more than one ethylenically unsaturated functionality may be employed to create crosslinked modified fluoro resin particles. Desirably, these will be employed at less than 5% by weight of the monomer mixture. Typical examples of suitable monomers of this type are allyl methacrylates, mono ethylene glycol dimethacrylate and diethylene glycol dimethacrylate.

The total quantity of acrylic monomer mixture employed may be from about 10 to about 200 parts by weight, preferably from about 20 to about 80 parts by weight, per 100 parts by weight of fluoropolymer seed.

As stated above, the seed polymerization may be carried out under the same conditions as are conventionally used for conventional emulsion polymerizations of acrylic and like monomers. A surfactant, a polymerization initiator, a chain transfer agent, a pH regulator and, optionally, solvent and chelating agents are combined with the seed latex and, after purging to remove molecular oxygen, the reaction is carried out under an inert atmosphere at atmospheric pressure, from 0.5 to 6 hours at temperatures of from about 20° C. to about 90° C. preferably from about 40° C. to about 80° C.

The reaction itself, using the fluoropolymer as a seed, may be performed according to any of the standard techniques known in the art for this type of reaction, such as, batch polymerization, wherein the totality of the monomer mixture is added into the fluoropolymer dispersion at the beginning of the reaction; semi-continuous polymerization, wherein part of the monomers mixture is added at the beginning of the reaction and then the remainder is fed continuously or in batches during the course of the reaction and continuous polymerization, wherein the monomers mixture is fed continuously or in batches throughout the course of the reaction.

It is also possible to perform the emulsion polymerization in one or more stages. If multi-stages are employed, each stage may contain the same monomers, surfactant, polymerization initiator, chain transfer agent, pH regulator, optional solvent and optional chelating agent as described above for the single stage process, or one or more of the ingredients may be varied, based on known principals from the art, from state to state depending on the desired morphology of the final particles of the latex formed during the reaction. The final latex particle may be composed of one, two or more phases, in addition to the innermost fluoropolymer phase, of various geometries, such as homogeneous particle, core-shell, incomplete core-shell, inverse core-shell, half-moon, strawberry, interpenetrating network and the like. All these geometries and morphologies are well known in the art as are the techniques for preparing them. Any particular geometry and/or morphology is not contemplated as a critical limitation by the present invention, but the preferred morphology is homogeneous particle.

It is not clear exactly how the fluoropolymer phase and acrylic and optional other monomer phase are arranged in the final particle, but it is thought that the monomer mixture is mostly absorbed or adsorbed by the fluoropolymer particles and polymerized while swelling the particles.

As the emulsifier, an anionic emulsifier, a nonionic emulsifier or a combination thereof may be used. In some cases an amphoteric or cationic surfactant may be employed. As the anionic surfactant, one may employ for example, a sodium salt of a sulfuric acid ester of a higher alcohol, a sodium alkyl benzene sulfonate, a sodium salt of a dialkyl succinate sulfonic acid and a sodium salt of an alkyldiphenylether sulfonic acid. Of these, preferred are sodium alkyl benzene sulfonate, sodium lauryl sulfate, a polyoxyethylene alkyl (or alkylphenyl) ether sulfonate and the like. As the nonionic emulsifier, one may employ, for example, polyoxyethylenealkyl ethers and polyoxyethylenealkyl aryl ethers. Preferred are a polyoxethylene nonylphenyl ether, polyoxethylene octylphenyl ether and the like. As the amphoteric emulsifier lauryl betaine and the like are suitable. As the cationic surfactant, one may employ, for example, an alkyl peridinium chloride, an alkyl ammonium chloride and the like. Also, emulsifiers copolymerizable with the monomers may be employed, such as, for example, sodium styrene sulfonate, sodium alkyl aryl sulfonate and the like.

The amount of surfactant or emulsifier used is normally from about 0.05 to about parts by weight per 100 parts by weight of the total of the vinylidene fluoride polymer particles and the monomer mixture.

As the polymerization initiator, any known water and oil soluble free radical sources for initiation of ethylenic polymerization may be employed.

As water soluble initiators, for example, one may employ a water soluble persulfonic acid salt and hydrogen peroxide. In some cases the polymerization initiator may be employed in combination with a reducing agent. Suitable reducing agents include, for example, sodium pyrosulfite, sodium hydrogen sulfite, sodium thiosulphate, L-ascorbic acid and its salts and sodium formaldehyde sulfoxylate. Oil soluble initiators, optionally dissolved in the monomer mixture or a solvent, include organic peroxides and azo initiators. Typical examples of these compounds are 2,2'-azobisisobutronitrile, 2,2'azobis-(4-methoxy-2,4-dimethylvaleronitrile), 2,2'-azobis-2,4-dimethylvaleronitrile, 1,1'-azobis-cyclohexane-1-carbo-nitrile, benzoyl peroxide, dibutyl peroxide, cumene hydroperoxide, isopropyl benzene hydroperoxide, p-methane hydroperoxide, t-butylperoxy-(2-ethyl hexanoate), succinic acid peroxide, and diacyl peroxides in general, peroxy di-carbonates and peroxymonocarbonates in general and peroxyesters in general including the t-amyl peroxyesters which have found use in assuring low residual monomer content. T-amyl hydroperoxide is also useful. Mixtures of initiators may also be used. Preferred initiators are: cumene hydroperoxide, isopropyl benzene hydroperoxide, ammonium persulfate, p-methane hydroperoxide, 2,2'-azobisisobutylonitrile, benzoyl peroxide, t-butyl hydroperoxide, 3,5,5-trimethylhexanolperoxide and t-butyl-peroxy-(2-ethyl hexanoate). The amount of the polymerization initiator used may be from about 0.1 to about 3 parts by weight of the monomer mixture.

Use of known chain transfer agents is contemplated. Such materials include, for example, halogenated hydrocarbons, such as carbon tetrachloride, chloroform, bromo form and the like, mercaptans, such as n-dodecyl mercaptan, t-dodecyl mercaptan, n-octyl mercaptan and the like, xanthogens, such as dimethylxanthogen disulfide, diisopropyl xanthogen disulfide and the like and terpenes, such as dipentene, terpinolene and the like. The amount of chain transfer agent is, preferably, from about 0 to about 10 parts by weight of the monomer mixture.

The chelating agent includes, for example, glycine, alanine, and ethylene diamine tetra acetic acid and the pH adjusting agent includes, for example, sodium carbonate, potassium carbonate and sodium hydrogen-carbonate. The amounts of chelating agent and pH adjusting agent used are from about 0 to about 0.1 part by weight and about 0 to about 3 parts by weight of the monomer mixture, respectively.

A small quantity of solvent may be added during the reaction to help swell the seed polymer. Typically, for example, these solvents may include methyl ethyl ketone, acetone, trichlorofluoroethane, methyl isobutyl ketone, dimethyl sulfoxide, toluene, dibutyl phthalate, methylpyrrolidone, ethyl acetate and the like, in such small amounts that the operability, safety against fire hazard, environmental safety and production safety are not impaired. The amount of solvent used is from about 0 to about 20 parts by weight per 100 parts by weight of the monomer mixture.

The final acrylic modified fluoropolymer particle size has been found to affect the properties of the latex resulting from the synthesis reactions and of coatings prepared from the particles. Small particle size is preferred to obtain good film formation and good coating gloss. The particle size should range from about 50 to 400 nm with 50 to 200 nm being preferred. If the average particle diameter is less than 50 nm the resulting aqueous dispersion has a high viscosity; accordingly, it is not possible to obtain high solids dispersions, and if higher shear conditions are applied, coagulation results. If the particle sizes are greater than 400 nm, poor storage stability of the latex results.

The average particle size of the acrylic modified fluoropolymers of the invention may be controlled by appropriately selecting the size of the vinylidene fluoride polymer particles.

Additional amounts of surfactants and/or pH adjusting agents may, if desired, be added to the final latex to improve its storage stability and/or film formation ability, as well as reactivity if a crosslinking chemistry is employed.

If desired, and preferably in non-crosslinking chemistries, the pH of the fluoropolymer latex is raised to above 7.0, more preferably above about 8.0, by the addition of a base for either partially or complete neutralization. Suitable bases include alkali metal hydroxides such as sodium and potassium hydroxide, aqueous ammonia, and primary, secondary or tertiary organic amines such as AMP-90 and AMP-95 (Angus Chemicals), triethyl amine, triethanolamine, butyl diethanolamine, and various hexyl, cyclohexyl, octyl, decyl, and dodecyl amine materials. Preferred are organic amines with one or more aliphatic side groups with at least four carbon atoms. Preferred organic amines include, but not limited to: n-butyl diethanol amine (BDEA), 2-butyl diethanolamine (BAE), octyl diethanolamine (ODEA), octyl amino ethanol (OAE), and 2-(diisopropylamino) ethanol. Neutralization using the preferred amines results in improved crack resistance of the coating.

If desired, the resin may be isolated by coagulating the latex and washing the resulting solids, after separation from the remaining liquid, with water. After drying, the solids are normally in the form of a fine powder.

The acrylic modified fluoropolymer dispersions formed by the processes of the invention may be used as is in a clear coat, or may be formulated as an aqueous emulsion-type coating by adding such typical paint additives as pigments, dispersing agents, thickeners, defoaming agents, anti-freezing agents, extender pigments, fillers, and film forming agents. One of skill in the art will readily be able to adjust the proportions of these additives to optimize the desired properties of the paints and the films formed therefrom. In one embodiment, pigments used are those known to have good reflectivity of solar infrared radiation, including rutile $TiO_2$, and particular classes of mixed metal oxide pigments such as the "Arctic" pigments sold by the Shepherd Color Company. Extenders and fillers known in the art can also be used including silica, calcium carbonate, talc, barytes, other minerals such as the "Minex" materials (nephylene syentite), and glass spheres.

The general process for forming a coating formulation involves the steps of 1) forming the fluoropolymer latex; 2) neutralization, 3) optionally adding a coalescent (solvent) and a thickener; 3) neutralization; 4) addition of a pigment dispersion (for a non-clear coat); 5) optionally adding a polyurethane dispersion.

The coating formulation may also include one or more water soluble or water dispersible resins, such as, but not limited to, N-methyl melamine resins, alkylated-methyl melamine resins, acrylic resins, urethane resins, epoxy resins, polyester resins, nylon resins, urea resins, alkyl resins, maleinized oils, (meth)acrylic resins, vinyl acetate resins, ethylene vinyl acetate resins, and the like. These may be added when formulating paints and other coating material from the acrylic modified fluoropolymer of the invention. One of skill in the art will also be able to optimize the number of, and relative proportions of, these additives also to obtain the desired properties of the final film forming mixture and the films and like products obtained therefrom.

The coating formulation should have a minimum film forming temperature (MFFT) that is less than the temperature of application. For a coating applied outdoors, the MFFT is preferably less than 15° C., and more preferably below 8° C. For a coating that is factory applied, and which can optionally be heated, such as by baking, the MFFT is preferably below 25° C., and more preferably below 15° C. The desired MFFT can be achieved by adjusting the composition of the fluoropolymer, as known in the art. The desired MFFT for the formulation can also be achieved by using a higher MFFT fluoropolymer plus additives that lower the MFFT of the formulation. Such additives include, but are not limited to: coalescing solvents, polyurethane dispersions, acrylic dispersions with low MFFT, and particular surfactants, which can be effective in lowering MFFT. MFFT-reducing additives can be added at levels of up to about 40 wt % on fluoropolymer solids, more preferably at levels of up to about 25 wt % on fluoropolymer solids, most preferably at levels of about 2-15 wt % on fluoropolymer solids.

In one embodiment the coating composition is a low VOC formulation, having from 0-10% by weight of coalescing solvent based on the weight of fluoropolymer solids. A coating formulation containing no coalescent can be used for coatings that are heated after application—such as by baking at a factory, or by flashing for a few seconds in a field application. For coatings that are air-dried, best film-forming results occur when 10 to 20 weight percent of coalescing solvent based on the weight of fluoropolymer solids is part of the formulation.

The coatings may be factory applied or applied in the field to flat or low slope flexible roof substrates, such as sprayed polyurethane foams. The coating is typically applied by spray, brush or roll-coat application. The coatings may be applied directly to a flexible roofing substrate, or on a of primer or tie-layer. A preferred embodiment is the application of this coating as a high performance topcoat over a conventional non-fluoropolymer basecoat system (i.e. acrylic, urethane, silicone). The thickness of the coating can be from about 0.2-20 mils, more preferably from about 0.5-10 mils for pigmented coatings, or from about 0.2-5 mils in the case of a clear coating.

One advantage of the coating composition of the invention is that factory applied coatings containing AMF are inherently block resistant, as opposed to conventional acrylics, urethanes and silicones. This is particularly of benefit when membranes are inline coated and rewound under conditions of elevated temperature and pressure.

The applied fluoropolymer coating has very low VOC levels and exhibits improved weatherability, dirt pickup resistance, and stain blocking properties compared to conventional acrylic, urethane and silicone coatings. White coatings that are solar reflective retain their reflectivity longer thus reducing the energy load required to cool the associated building.

The following examples further illustrate the best mode contemplated by the inventors for the practice of the invention and are to be construed as illustrative thereof and not in limitation thereof.

EXAMPLES

Preparation of AMF Polymers

Example 1

Vazo-67 (0.5 g), sodium lauryl sulfate (8.0 g) and fluoropolymer latex (resin composition is of 75 percent VF2/25 percent HFP, 41.4 weight percent solids, 2000 g) are precharged into a kettle equipped with a condenser, high purity argon and monomer inlets and a mechanical stirrer.

In a separate vessel, a monomer mixture of methyl methacrylate (67 g), butyl acrylate (17.0 g), methacrylic acid (8 g) and isooctyl mercaptopropionate (0.35 g) is prepared.

After the reactor and its initial contents were flushed and purged for 30 minutes, an initial charge of monomer mixture (50.35 g) is introduced into the reactor. The mixture is then stirred for 60 minutes under argon at ambient pressure and temperature. Then the reactor and its contents were heated to 70° C. After 60 minutes, the remaining monomer mixture was fed (42.0 g). The monomer feed rate was adjusted with the aid of a syringe pump. When all monomer mixture had been added, residual monomer was consumed by maintaining the reaction temperature at 70° C. for an additional 120 minutes.

The reaction mixture is then cooled to ambient temperature, vented and the latex produced by the reaction filtered through cheesecloth. Polymer resin is then recovered as a fine powder by coagulation of the latex and washing the recovered solids with water and drying. The final solids content of the latex before solids recovery was 44 weight percent.

Example 2

Vazo-67 (1.0 g), sodium lauryl sulfate (5.0 g) and fluoropolymer latex (resin composition is of 75 percent VF2/25 percent HFP, 41.6 weight percent solids, 1400 g) are precharged into a kettle equipped with a condenser, high purity argon and monomer inlets and a mechanical stirrer.

In a separate vessel, a monomer mixture of methyl methacrylate (190 g), butyl acrylate (50.0 g), methacrylic acid (7 g) and isooctyl mercaptopropionate (0.85 g) is prepared.

After the reactor and its initial contents were flushed and purged for 30 minutes, an initial charge of monomer mixture (124.85 g) is introduced into the reactor. The mixture is then stirred for 30 minutes under argon at ambient pressure and temperature. Then the reactor and its contents were heated to 70° C. After 35 minutes, the remaining monomer mixture was fed (123.0 g). When all monomer mixture had been added, residual monomer was consumed by maintaining the reaction temperature at 70° C. for an additional 60 minutes. The reaction mixture is then cooled to ambient temperature, vented and the latex produced by the reaction filtered through cheesecloth. The final solids content of the latex before solids recovery was 49 weight percent.

Coating Composition:

Formulation of AMF elastomeric coating involves several stages: Neutralization, Clearcoat Formulation, Pigment Dispersion, and Final Formulation.

Neutralization—1400 g of the AMF latex listed above was run through a 5μ filter and 3 separate aliquots of 350 g each were reserved in clean, capped, clear glass jars. Each aliquot was measured for initial pH (which ranged between 2.86 and 2.94), and was then neutralized under agitation to ~pH 8.5 with one of three agents:

Neutralizer 1: 28% wt. Ammonium Hydroxide,

Neutralizer 2: 100% 2 amino, 2-methyl, 1-propanol (AMP-95 from Angus)

Neutralizer 3: 100% n-Butyl Diethanolamine (Vantex® T from Arkema, Inc.).

Clearcoat Formulation—Approximately 50 g of each neutralized latex was then admixed with dipropylene glycol methyl ether (DPM) or diethylene glycol butyl ether (DEB) to 10% by weight on resin solids to form a clearcoat. These clearcoats were drawn down over LENETA charts with a 10 mil blade to determine their dry film properties. All candidates passed this initial test, giving transparent films having no stress cracking or crawling.

Pigment Grind Recipe A—The following Grey Grind recipe was initially used to test paint behavior in early roofing paint formulations:

| | |
|---|---|
| D.I. Water | 266.5 g |
| Ammonia | 0.1 g |
| Disperbyk® 180 (BYK-Chemie) | 12.5 g |
| Foamex® 810 (Tego) | 1.2 g |
| Triton™ CF-10 (Dow) | 5.0 g |
| RCL 6T (TiO$_2$ Millennium Chemicals) | 400.0 g |
| Shepherd Black 10C909 | 100.0 g |

These materials were Cowles Ground to a Hegman reading of 7.5 or better

Coating Formulation 1—15.6 g of this Grey Grind were mixed with 48.0 g of each of the Clearcoats listed above to make the first coatings. These were drawn down over LENETA charts to test for adequate adhesion and film formation.

Pigment Grind B—Many of the formulations with Pigment Grind A failed due to excess internal film stress during drying. Therefore the recipe was modified, by the addition of 3 g of MINEX 7 (an extender) and 0.4 g Acrysol RM 825 (an associative thickener from Rohm and Haas).

White Pigment Coating—White Titanium Dioxide formulations designed for higher total reflectance were formulated as follows:

| | |
|---|---|
| D.I. Water | 129.4 g |
| Ammonia | 0.1 g |
| Disperbyk 180 | 12.5 g |
| Foamex 810 | 1.2 g |
| Triton™ CF-10 | 5.0 g |
| RCL 6T | 500.0 g |

These materials were Cowles Ground to a Hegman reading of 7.5 or better

Two clearcoats were formulated, one using AMF/BDEA/DPM, and one using AMF/BDEA/DEB Two sample white pigment coating formulations were made for each clearcoat, one with MINEX® 7 (Sibelco), and one without MINEX 7. A polyurethane dispersion (SANCURE 815, Noveon, Inc.) was added to each paint at 7% by weight on resin solids to promote adhesion, and stabilize the films and better film formation. The pigment volume concentration (PVC) is shown for each of the formulations below:

Example 3

| | |
|---|---|
| Clearcoat (AMF/BDEA/DPM) | 70.0 g |
| Pigment Grind | 23.3 g |
| RM 825 | 0.6 g (No Minex, PVC = 17) |

Example 4

| | |
|---|---|
| Clearcoat (AMF/BDEA/DPM) | 70.0 g |
| Pigment Grind | 23.3 g |
| Acrycol ® RM 825 (Rohm and Haas) | 0.6 g |
| SANCURE ® 815 (Noveon) | 6.1 g (No Minex, PVC = 17) |

Example 5

| | |
|---|---|
| Clearcoat (AMF/BDEA/DPM) | 70.0 g |
| Pigment Grind | 23.3 g |
| RM 825 | 0.6 g |
| SANCURE ® 815 | 6.1 g |
| MINEX ® 7 | 14.4 g (PVC = 35) |

Example 6

| | |
|---|---|
| Clearcoat 12473-32-1(AMF/BDEA/DEB) | 70.0 g |
| Pigment Grind | 23.3 g |
| RM 825 | 0.6 g |
| SANCURE ® 815 | 6.1 g (No Minex, PVC = 17) |

Example 7

| | |
|---|---|
| Clearcoat (AMF/BDEA/DEB) | 70.0 g |
| Pigment Grind | 23.3 g |
| RM 825 | 0.6 g |
| SANCURE ® 815 | 6.1 g |
| MINEX ® 7 | 14.4 g (PVC = 35) |

These white coatings were drawn down over SOLARFLEX primer that had been tinted gray with a water based black pigment grind. Primer was applied using a 20 mil blade ethylene/propylene diene monomer liner (EPDM), bitumen modified with active polypropylene (APP 166), White thermoplastic polyolefin (TPO) and Grey TPO, available from The Russell Roofing Company of Oreland, Pa. These were allowed to dry overnight, and then the four white coatings described above were drawn down over this primer using a 10 mil blade. The coatings were allowed to air-dry, and examined for defects. Example 3 (without SANCURE® 815) failed by exhibiting cracks. The other formulations (Examples 4-7) gave a good, crack-free coating.

Example 8

A. AMF clear coat formulation was prepared using RC-10206, a neutralized AMF latex of 70 wt % fluoropolymer, 30 wt % acrylic at 48 wt % solids, as described the Clearcoat Formulation section above. The formulation was further diluted with D.I. water to 43% by weight resin solids.

B. White Titanium Dioxide formulations designed for higher total reflectance were formulated as follows

| | |
|---|---|
| D.I. Water | 133.96 g |
| Ammonia | 0.1 g |
| Disperbyk ® 180 | 7.5 g |
| Foamex ® 810 | 1.2 g |
| Triton ™ CF-10 | 5.0 g |
| RCL 6T | 500.0 g |

C. White paint formulation at PVC of 18% were prepared by mixing the clear coat with the TiO$_2$ formulation mentioned above. Thickener Acrysol® RM-825 (Rohm and Haas) was added to adjust the viscosity of the formulation

| | |
|---|---|
| Clear Coat (A)) | 280 gm |
| TiO$_2$ pigment grind (B) | 93.33 gm |
| Acrysol ® RM-825 | 2.41 gm |

D. Sancure®-815 from Noveon was added at 10 wt % solids on AMF solid in the white paint formulation

| | |
|---|---|
| White paint Formulation(C) | 290 gm |
| Sancure ®-815 | 26.54 gm |

E. Five different phosphate surfactants were added at 2 wt % solids on AMF solids to five subdivided parts of the white formulation (D)

| | |
|---|---|
| White paint formulation (D) | 50 gm |
| Trition ™ X405 (Dow) | 0.48 gm |
| White paint formulation (D) | 50 gm |
| Strodex ® SEK-50D (Dexter) | 0.68 gm |
| White paint formulation (D) | 50 gm |
| Strodex ® NB-20 (Dexter) | 0.35 gm |
| White paint formulation (D) | 50 gm |
| Strodex ® PK-0VOC (Dexter) | 0.85 gm |
| White paint formulation (D) | 50 gm |
| Envirogem ® AE01 (Air Products) | 0.34 gm |

All the five final formulations were stable with respect to settling and syneresis.

The five paints were applied over Henry Solarflex® acrylic based elastomeric base coat. Formulation with Strodex SEK-50D and PK-0VOC and Triton X-405 formed excellent crack free film upon drying. The rest of the two formulations showed evidence of stress cracks over the base coat upon drying.

Example 9

Three more white paint formulations were prepared similar to Example 8. In two formulations Sancure-815 was replaced with either Acrysol® WS-24 (Rohm and Haas) or NeoCryl® XK-90 (DSM Neoresin) at 10 wt % solids on AMF solid. Third white paint formulation was formulated with 50:50 blend ratio of WS-24 and NeoCryl® XK-90.

All the three formulations were coated on top of the Henry Solarflex® acrylic based elastomeric base coat, which upon drying showed evidence of stress crack.

Example 10

AMF clear coat formulation was prepared as described the Clearcoat Formulation section above. The formulation was further diluted with D.I. water to 43% by weight resin solids. White Titanium Dioxide formulations designed for higher total reflectance were formulated as follows

| | |
|---|---|
| Water | 135 gm |
| Disperbyk ® 180 (Byk Chemie) | 12.5 gm |
| Ammonia | 0.2 gm |
| Foamex ® 810 | 1.2 gm |
| Triton ® CF-10 | 5 gm |
| TiPure ® R-960 (Dupont) | 500 gm |

White paint formulations were prepared at two levels of Sancure®-815: 10 and 25 wt % solids on AMF solid. PVC levels were at 18% for both formulations.

| | | |
|---|---|---|
| A. | Clear Coat(AMF/DPM/Water) | 232.56 gm |
| | White Titanium DiOxide Formulation | 93.5 gm |
| | Sancure ®-815 | 28.6 gm |
| | Strodex ® PK-0VOC | 5 gm |
| | Byk-346 (Byk Chemie) | 1.08 gm |

| | | |
|---|---|---|
| B. | Clear Coat(AMF/DPM/Water) | 581.4 gm |
| | White Titanium DiOxide Formulation | 233.75 gm |
| | Sancure ®-815 | 178 gm |
| | Strodex ® PK-0VOC | 12.5 gm |
| | Byk-346 (Byk Chemie) | 3.02 gm |

The Zahn Cup number 2 viscosity of the formulations were 26.8 s and 28.3 s respectively. Both formulations had good settling and syneresis resistance. Film casted on top of Henry Solarflex® acrylic based elastomeric base coat were excellent and stress crack free upon drying.

Steady state water uptake of films casted from the two formulations (A and B) on scrub LENETA were 0.8% and 1.3% water per unit film weight. Water uptake of Henry Solarflex® coatings were in the range of 1.2-1.5% water per unit film weight.

Example 11

A tan roofing paint was prepared according to the following recipe:

| PIGMENT GRIND | Amount, gms |
|---|---|
| Water | 67.5 |
| Disperbyk-180 | 15.0 |
| Ammonia | 0.1 |

| -continued | |
|---|---|
| Tegofoamex 810 | 0.7 |
| Triton CF-10 | 3.0 |
| Meteor 9730 (Engelhard, Inc.) | 36.0 |
| TiPure R-960 TiO2 (DuPont) | 264.0 |
| Total | 383.30 |
| Water | 67.5 |

| TAN ROOFING PAINT Ingredients | Amts. Gm |
|---|---|
| RC-10206 | 872.00 |
| Tegofoamex 805 | 1.40 |
| DB (8% on resin) | 35.00 |
| Water | 105.00 |
| Pigment Grind | 330.00 |
| RM-8W (0.25%) | 2.20 |
| Total Paint | 1345.60 |

The paint had a pigment volume concentration of about 18%, a weight solids of about 51%, and a volume solids of approximately 35%.

The paint was applied to a "Leneta chart" coated paper substrate (available from the Leneta Company) and dried at room temperature. The dry film thickness was measured to be 30 microns. Then the total solar reflectance (TSR) of the paint was measured according to ASTM C 1549 using an SSR-ER reflectometer (Devices and Services Company, Dallas, Tex.). A TSR value of 0.746 was obtained.

Example 12

Clear coat formulations were prepared using the following formula:

| | |
|---|---|
| RC-10206 AMF latex | 200.0 g |
| Co-resin dispersion | 29.7 g |
| Dipropylene glycol methyl ether | 9.7 g |
| Acrysol RM-8W | 0.3 g |

The formulations were tested for MFFT using a Sheen MFFT Bar (available from Gardner Instruments). The following results were obtained:

| Example | Co-resin dispersion (all from DSM Resins, Inc.) | Formulation MFFT, ° C. | Clear coat 20° gloss on black glass |
|---|---|---|---|
| 12A | No co-resin | 7 | 60 |
| 12B | Neorez R-960 | <0 | 68 |
| 12C | Neorez R-9000 | 5 | 66 |
| 12D | Neorez R-9649 | 9 | 64 |
| 12E | Neorez R-9679 | 4 | 69 |
| 12F | Neorez XK-98 | 6 | 64 |
| 12G | Neorez R-9603 | 1.5 | 62 |

The clear coats were also used to prepared white roofing paints by combining them with a white pigment dispersion, as in example 8. All of the paints were glossy and had good hiding and good adhesion to a flexible acrylic primer/basecoat and to a commercial KYNAR 500® PVDF based paint on a steel substrate.

What is claimed is:

1. An aqueous-based flexible roof coating composition comprising an aqueous dispersion of an acrylic-modified fluoropolymer (AMF) having a weight average molecular weight of greater than 100,000, applied on top of a flexible roof substrate, wherein AMF is prepared by fluoropolymer seed polymerization process.

2. The roof coating composition of claim 1 wherein said acrylic-modified fluoropolymer comprises from 70 to 90 weight percent of a vinylidene fluoride/hexafluoropropylene (HFP) seed copolymer.

3. The roof coating composition of claim 2 wherein said HFP is present in the vinylidene fluoride/hexafluoropropylene copolymer at from 18 to 28 weight percent.

4. The roof coating composition of claim 1 wherein said acrylic-modified fluoropolymer has been neutralized, either partially or entirely, by an organic amine comprising at least one alkyl group having four or more carbons in the side chain.

5. The roof coating composition of claim 4 wherein said organic amine is selected from the group consisting of n-butyl diethanolamine, 2-butyl diethanolamine, octyl diethanolamine, octyl amino ethanol, and 2-(diisopropylamino) ethanol.

6. The roof coating composition of claim 1 wherein said acrylic modified fluoropolymer comprises from 10 to 200 parts by weight of acrylic portion for each 100 parts by weight of fluoropolymer.

7. The roof coating composition of claim 1 wherein said acrylic modified fluoropolymer comprises from 20 to 80 parts by weight of acrylic portion for each 100 parts by weight of fluoropolymer.

8. The roof coating composition of claim 1 further comprising one or more adjutants selected from the group comprising pigments, dispersing agents, thickeners, defoaming agents, anti-freezing agents, extender pigments, fillers, and film forming agents.

9. The roof coating composition of claim 1 wherein said coating composition further comprises from 0-20 percent by weight of a coalescing solvent, based on the weight of fluoropolymer solids.

10. The roof coating composition of claim 1, wherein said coating composition is coalescent-free.

11. The roof coating composition of claim 1, further comprising up to 40 weight percent, based on fluoropolymer solids, of one or more additives.

12. The roof coating composition of claim 11, wherein said additives are selected from the group consisting of coalescing agents, polyurethane dispersions, acrylic dispersions with a low minimum film forming temperature (MFFT), and surfactants that are effective in lowering the MFFT.

13. The roof coating composition of claim 11, wherein said additives are present in the roof coating composition at from 2-15 weight percent, based on fluoropolymer solids.

* * * * *